Figures 1, 2:
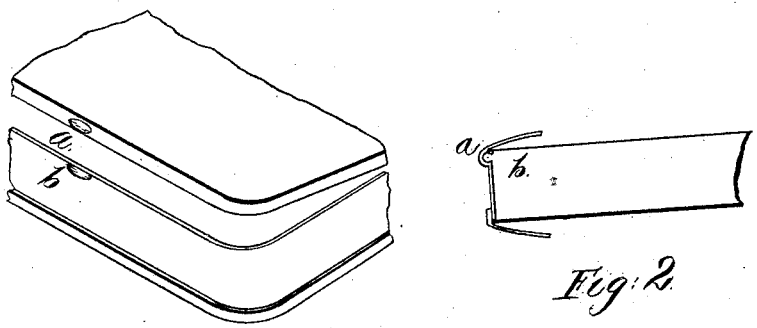

G. N. Cummings,
Spectacle-Case Fastening.
Nº 26,891.   Patented Jan. 24, 1860.

Witnesses:
S. H. Maynard
George H. Stott

Inventor:
G. N. Cummings

UNITED STATES PATENT OFFICE.

GEORGE N. CUMMINGS, OF MERIDEN, CONNECTICUT.

CATCH FOR SPECTACLE-CASES.

Specification forming part of Letters Patent No. 26,891, dated January 24, 1860.

*To all whom it may concern:*

Be it known that I, GEORGE N. CUMMINGS, of Meriden, New Haven county, Connecticut, have invented a certain new and useful Improvement in the Fastening of Spectacle and Similar Cases; and I do hereby declare that the following is a full, clear, and exact description of the same, reference being made to the annexed drawings, making a part of this specification.

My improved snap or catch for fastening the lids of metal tobacco-boxes, spectacle-cases, and all similar metal boxes and cases, consists in forming the same in a peculiar manner out of or upon the metal itself by taking advantage of its ductile and elastic properties, whereby I am enabled to make a snap of an efficient character without adding, except in the most trifling degree, anything to the expense of manufacture.

My said improvement lies in simply producing two indentations with a proper tool, one in the forward part of the rim of the cover and struck from the inside, so as to produce a protuberance on the other surface, and the other of like character, also from the inside, upon the rim of the box part. This is to be so situated that the upper projection will come opposite to the lower one in closing the lid. Now, as the rim of the cover overlaps the body it will strike against the projection; but by forcing the lid down the concave of the upper cavity will overlap the projecting side of the lower one, and the two will snap together.

Figure I represents a box with the lid raised, showing the two projections *a* and *b*, which, it will be seen, may be made by the same tool, and are produced by a blow upon a round ended punch so placed and struck as to make a cavity in the inside and a corresponding bulge on the outside of each part. Fig. II is a section showing the box closed and the manner in which the cavity on the lid fits over the bulge on the side of the box.

This simple device is as effective as any of the spring-catches, serving, in addition to keeping the box closed, also as a guide to bring the cover always accurately in place.

I claim—

Forming a snap for metal boxes, such as spectacle-cases, tobacco-boxes, &c., by making corresponding indentations on the rim of the lid and on the side of the said boxes, in the manner and for the purpose set forth herein.

In testimony I have hereunto subscribed my name.

G. N. CUMMINGS.

Witnesses:
S. H. MAYNARD,
GEORGE H. MOTT.